United States Patent [19]

Potier

[11] 4,203,754
[45] May 20, 1980

[54] APPARATUS FOR BENDING GLASS SHEETS

[75] Inventor: M. Pierre Potier, Sartrouville, France

[73] Assignee: Saint-Gobain Industries, Neuilly-sur-Seine, France

[21] Appl. No.: 886,101

[22] Filed: Mar. 13, 1978

[30] Foreign Application Priority Data

Mar. 18, 1977 [FR] France .............................. 77 08119

[51] Int. Cl.[2] ............................................ C03B 23/02
[52] U.S. Cl. ...................................... 65/273; 65/106; 65/285; 65/287
[58] Field of Search ................. 65/106, 107, 285, 287, 65/273

[56] References Cited

U.S. PATENT DOCUMENTS

| 2,898,662 | 8/1959 | Robertson | 26/63 |
|---|---|---|---|
| 3,052,396 | 9/1962 | Butscher | 226/192 |
| 3,220,538 | 11/1965 | Kelley | 198/192 |
| 3,401,607 | 9/1968 | Wortman | 92/39 |
| 3,500,524 | 3/1970 | Jagminas | 29/116 |
| 3,545,951 | 12/1970 | Nedelec | 65/107 X |
| 3,604,087 | 9/1971 | Beck | 29/127 |
| 3,831,239 | 8/1974 | Hoff et al. | 65/106 X |
| 3,838,480 | 10/1974 | Depuy | 26/63 |
| 3,871,855 | 3/1975 | Frank | 65/245 |
| 3,905,794 | 9/1975 | Revells et al. | 65/106 |

FOREIGN PATENT DOCUMENTS

| 546539 | 4/1956 | Belgium . |
|---|---|---|
| 919918 | 7/1949 | Fed. Rep. of Germany . |
| 1365334 | 5/1964 | France . |
| 2079427 | 12/1971 | France . |
| 1021308 | 3/1966 | United Kingdom . |
| 1255303 | 12/1971 | United Kingdom . |

Primary Examiner—Arthur D. Kellogg
Attorney, Agent, or Firm—Pennie & Edmonds

[57] ABSTRACT

An improved glass bending device is disclosed for bending and conveying glass sheets. The glass bending device includes a rod having a curved portion, a rotary tubular member engaged about the rod, and a plurality of rings disposed between the rod and the tubular member. In the improvement, the rotary tubular member has internal threading, a plurality of annular support means having external threading are disposed along spaced locations within the tubular member in mating relation with the internal threading thereof, and each of the rings are affixed within one of the annular support means.

8 Claims, 4 Drawing Figures

APPARATUS FOR BENDING GLASS SHEETS

BACKGROUND OF THE INVENTION

Apparatus for th production of curved sheets of material such as glass is of particular importance in the shaping of automobile windshields and windows.

A device is known for continuously bending glass sheets in a horizontal position. In construction the device includes a succession of arched rollers mounted on a curved rod and covered with a tubular casing in the form of a thin layer of material. The setting of the rollers generates a curved crosswise contour to the covering material. The glass sheets are heated to a desirable glass softening temperature and then passed transversely over the arched rollers to achieve the desired arcuate configuration defined by the layer of material. The tubular casing must be made of refractory material in order to withstand the glass bending temperature, which ranges from at least 600°-700° C. Additionally, its structure must impart both good torsional resistance and flexibility in the axial direction in order to accommodate strains and stresses resulting from rotation about a curved rod.

Apparatus for conveying deformable webs, in particular, fabrics are also known in the art. Such apparatus consists of an array of curved or arched rods, ech of which is surrounded by a flexible frame which includes a metal wire wound into a helical coil spring. The frame is supported at conveniently spaced locations internally by threaded flanges introduced therein. The exterior of the frame is surrounded by a flexible cylindrical sheath. To provide for the conveyance of glass sheets while imparting to them the precise arcuate shape desired, a sheath including a wire rolled into a helix does not provide sufficient logitudinal rigidity. For this reason, it is necessary to use a flexible tube in its place, which, however, has continuous generatrices.

U.S. Pat. No. 3,545,951 to Nedelec and assigned to the assignee of the present application, discloses a construction using thin stainless steel ringed tubes. These tubes are surrounded by a flexible sheath made of braided mineral fibers to prevent the glass surface from being marked by the undulations of the metal tubes. In order to reduce wear and eliminate other drawbacks due to friction of the ringed tubes on the arched rod, a plurality of sliding rings can be positioned at spaced locations within the tubular member. Such a construction is disclosed in U.S. Pat. No. 3,831,239 to Hoff et al. and also assigned to the assignee of the present application. The sliding rings, which may be made of graphite, support the tubular member while centering it on a curved rod. Since the length of a curved rod, and therefore of the rotary tubular member is sometimes substantial, it became necessary, in order to allow the assembly of the sliding rings inside tubular members to cut them beforehand into a sufficient number of sections so that they correspond to the length of the curved rod. A sliding ring is positioned at the junction of two sections before mutually butt welding the abutting sections.

SUMMARY OF THE INVENTION

The present invention relates to an improved glass bending device of the type which includes a rod having a curved portion, a rotary tubular member engaged about the rod and a plurality of rings disposed between the rod and the tubular member. In the improvement the rotary tubular member has a helical undulating wall defining internal and external threading. A plurality of annular support means are disposed at spaced locations within the rotary tubular member. Each support means has a sliding ring mounted thereon with the bore of each ring corresponding to the diameter of the rod. Each support means is also provided with external threading matching the threading of the tubular member whereby the support means may be easily threaded into the tubular member to the desired locations.

By selecting a sufficient number of annular support means and by spacing them suitably inside the tubular member, a one piece assembly of any desired length is obtained which can be slipped simply onto the arched rod and coupled through one end to a motor member to permit rotation of the bending device.

The fact that the assembly of the sliding rings inside the helical tubular member is greatly facilitated by the invention results from the fact that it is no longer necessary to cut the tubular member into sections nor to butt weld the sections with interposition of a sliding ring at each weld. Further, the external undulations of the tubular member are regularly spaced and all have the same external diameter. This obviates the need to provide diameter adjustment collars at right angles to the welds as discussed in the U.S. Pat. No. 3,831,239 to Hoff et al.

The assembly of the sliding rings is effected very simply by advancing the threaded supporting collars inside the tubular member to the desired location. In order to prevent untimely unscrewing, i.e., axial shifting of the sliding rings during rotation of the tube, it is advisable to ensure blocking of the supporting collars in an adequate position using one or two spot welds applied from the outside. The technique of electric welding, or other suitable means of attachment may be used for this purpose.

DESCRIPTION OF THE PREFERRED EMBODIMENTS

Figure 1:
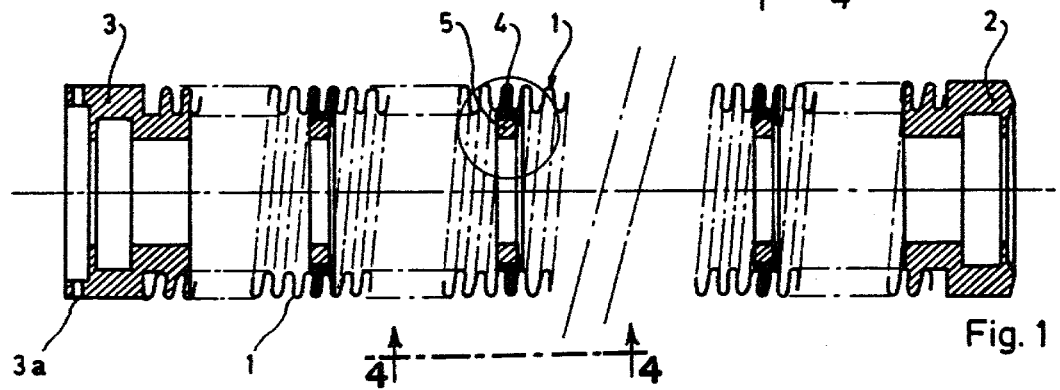
FIG. 1 is a fragmentary axial top view partly in section of a tubular member according to the present invention.

FIG. 1 illustrates fragmentary portions of a tubular member 1 having undulating helical peripheral portions which define a threaded exterior and interior. The tubular member may, for example, be made of stainless steel having a thickness of about 0.2 mm.

The tubular member 1 can be made to any desired length. Typically its length corresponds to a curved or arched rod about which the tubular member engages. One end of the tubular member is attached to a threaded ferrule 2. The other end of the tubular member is attached to a threaded ferrule 3 having diametrically opposed holes 3a for coupling with a motor member (not shown).

Threaded annular support means in the form of metal collars 4 having external threading are matingly engaged at conveniently spaced locations within the tubular member 1. Disposed within each of the externally threaded collars 4 is a concentric sliding ring 5 which may, for example, be made of graphite. The interaction of sliding ring 5 within externally threaded collar 4 is shown enlarged in FIG. 2.

Externally threaded collars 4 may be provided with shallow cavities (not shown) in their interior surfaces for rotating each collar to its desired location by means of a fork-shaped driving tool (not shown) whose teeth are designed to penetrate the cavities so as to rotate the collar. Typically, the cavities are diametrically opposed. The driving tool, of course, can be mounted on an extension handle to accommodate a tubular member of any length.

Figure 2:
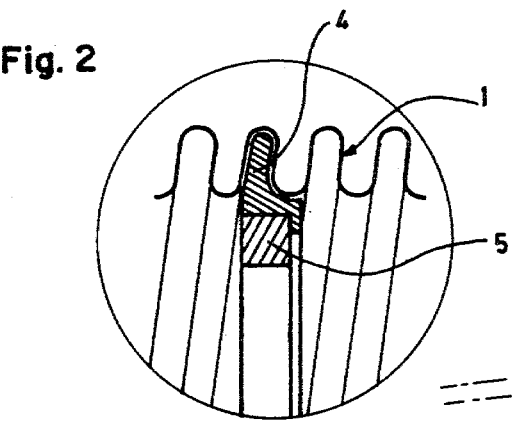
FIG. 2 is an enlarged schematic view of a detail of the embodiment of FIG. 1.
Figure 4:
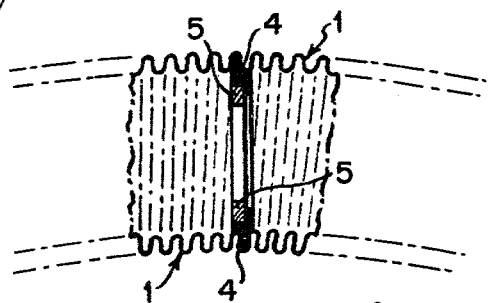
FIG. 4 is a fragmentary axial side view partly in section taken along lines 4—4 of FIG. 1 showing a curved portion of the rod thereof.

The portion of the metal collar 4 penetrating into an undulation of tubular member 1, as shown in FIG. 2, can be externally electrically spot welded to this undulation so that the collar will not unscrew during the rotation of the tube.

Further improvements made possible by the invention as a result of the helical nature of the undulations of the tubular member will now be described.

As is well known, the curvature imparted to glass sheets which are passed over a layer of arched rods of given curvature could be modified up to now only by changing the inclination of the rods around a horizontal axis passing through their two end parts. More specifically, the resulting curvature could therefore vary only from a zero value (when the rods whose end portions are coupled for uniform rotation were all disposed in a single horizontal plane) to a maximum value (when the rods were rotated to 90°, i.e., perpendicularly, with respect to this plane), this maximum curvature being a function of the curvature of the rod itself. In particular, if the rods had a symmetrical curvature with respect to their midpoint, the glass sheets adopted correspondingly symmetrical curvatures from these rods.

With the present invention, it is possible to modify the curvature acquired by a glass sheet beyond the limit set by the maximum inclination of the rods or, further, to obtain an unsymmetrical curvature on rods having symmetrical curvature.

Figure 3:
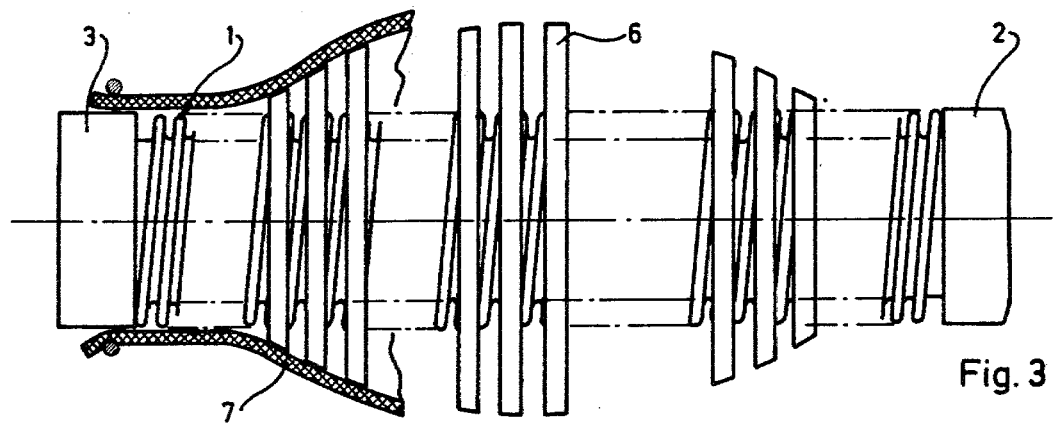
FIG. 3 is a fragmentary axial top view partly in section of another embodiment of this invention.

Also with the external threading formed by the helical undulations of the wall of the tubular member, (FIG. 3), an internally threaded collar 6 can be engaged about tubular member 1. Different collars 6 can be chosen to provide any diameter. By the judicious association of the collars on the rods of a given curvature, it is possible to either increase the curvature of the glass with respect to that of the rods or to impart to it an unsymmetrical curvature.

It is further possible, if desired, to obtain bent glass sheets the profile of which has a point of inflection. Collars 6 which make it possible to obtain this result can be simple metal collars having an internal threading which corresponds to the pitch of the helical undulations of the tubular member. These collars are simply screwed onto the tube and are easily interchangeable in diameter and in position along the latter. Spacers (not shown) may be provided between neighboring collars. Accordingly, it becomes possible to obtain all desired profiles of glass curvature, which considerably facilitates switching from one production run to another without having to change the arched rods and rotary tubular members.

Although tubular member 1 or collars 6 can be used uncovered under certain conditions, it is generally advantageous to cover them with a flexible sheath 7 consisting, as indicated above, of braided mineral fibers.

I claim:
1. In a continuous glass sheet conveying and bending device of the type including a rod having a curved portion, a rotary flexible tubular member slidably disposed about at least said curved portion of said rod for supporting and conveying the glass sheet thereover, and a pluality of rings rotatably disposed on said rod and within said tubular member, the improvement wherein:
   (a) said rotary tubular member is of solid wall construction lengthwise thereof with internal threading;
   (b) a plurality of annular support means having external threading maing with the internal threading of said rotary tubular member for internally supporting said rotary tubular member thereon and positioned along spaced locations within said tubular member; and
   (c) each of said rings being affixed within one of said annular support means to maintain said tubular member in rotary relation about said rod.
2. The improved glass bending device according to claim 1 wherein:
   (a) the annular support means are welded to the internal threading of said tubular member.
3. The improvedd glass bending device according to claim 2 wherein:
   (a) said tubular member is a relatively thin-walled metallic construction.
4. The improved glass bending device according to claim 3 wherein said sliding rings are of graphite.
5. The improved glass bending device according to claim 4 further comprising:
   (a) a flexible sheath member disposed about said rotary tubular member.
6. The improved glass bending device according to any one of claims 1-5 wherein:
   (a) the tubular member is externally threaded; and
   (b) the outside diameter of the tubular member is relatively constant.
7. In a glass bending device of the type including a rod having a curved portion, a rotary tubular member disposed about at least said curved portion of said rod, and a plurality of rings rotatably disposed on said rod and within said tubular member, the improvement wherein:
   (a) said rotary tubular member has:
      (i) internal threading,
      (ii) external threading, and
      (iii) a relatively constant outside diameter;
   (b) a plurality of annular support means having external threading mating with the internal threading of said rotary tubular member for internally supporting said rotary tubular member thereon and positioned along spaced locations within said tubular member;
   (c) each of said rings being affixed with one of said annular support means to maintain said tubular member in rotary relation about said rod; and
   (d) a plurality of collars each having internal threading disposed in spaced relation about said tubular member, at least some of said collars having different diameters so as to variably augment the external diameter of the rotary tubular member.
8. The improved glass bending device according to claim 7 further comprising:
   (a) a flexible sheath member disposed about said internally threaded collars.

* * * * *